United States Patent [19]
Gabas

[11] Patent Number: 5,274,532
[45] Date of Patent: Dec. 28, 1993

[54] REMOVABLE MIRROR DEVICE FOR MOTOR VEHICLE INTERIORS

[75] Inventor: Carlos Gabas, Barcelona, Spain

[73] Assignee: Industrias Techno-Matic, S.A., Calle Espronceda, Spain

[21] Appl. No.: 690,918

[22] PCT Filed: Oct. 24, 1990

[86] PCT No.: PCT/ES90/00039
§ 371 Date: Jun. 14, 1992
§ 102(e) Date: Jun. 14, 1992

[87] PCT Pub. No.: WO91/06442
PCT Pub. Date: May 16, 1991

[30] Foreign Application Priority Data
Oct. 26, 1989 [ES] Spain ................... 8903609

[51] Int. Cl.⁵ .............................. B60Q 3/00
[52] U.S. Cl. ........................... 362/135; 362/74; 362/144
[58] Field of Search ............... 362/74, 135, 136, 137, 362/140, 141, 142, 143, 144, 373; 296/97.1, 97.2, 97.3

[56] References Cited
U.S. PATENT DOCUMENTS

| | | | |
|---|---|---|---|
| 2,001,743 | 5/1935 | Morrison | 362/144 |
| 2,046,393 | 7/1936 | Lewinsohn et al. | 362/144 |
| 4,202,030 | 5/1980 | Kimura | 362/144 |
| 4,364,597 | 12/1982 | Viertel et al. | 362/137 |
| 4,486,819 | 12/1984 | Marcus et al. | 362/142 |
| 4,710,856 | 12/1987 | Cheung | 362/135 |
| 4,734,831 | 3/1988 | Keyser et al. | |
| 4,751,618 | 6/1988 | Iacovelli | 362/142 |
| 4,866,579 | 9/1989 | Miller et al. | 362/140 |
| 4,984,137 | 1/1991 | Maemura | 362/144 |

FOREIGN PATENT DOCUMENTS
1529662 5/1968 France ................ 362/136

Primary Examiner—Albert J. Makay
Assistant Examiner—Y. Quach
Attorney, Agent, or Firm—Michael J. Striker

[57] ABSTRACT

A removable mirror device for motor vehicle interior has a fixed outer frame, a removable mirror unit snugly housed in the fixed outer frame, electric illumination element provided in the mirror unit, dry cells located in the mirror unit, and a switching element operative for supplying the electric illuminating element of the mirror unit either from the drive cells located in the mirror unit from a battery of a motor vehicle.

26 Claims, 4 Drawing Sheets

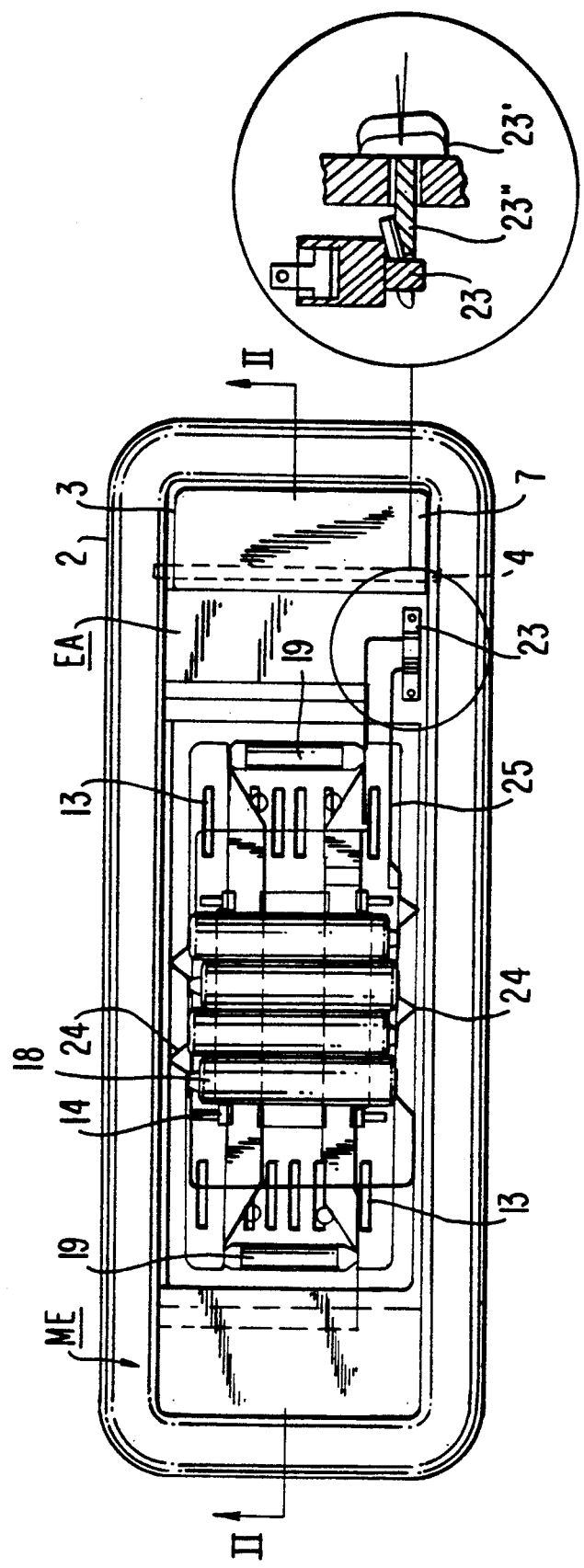

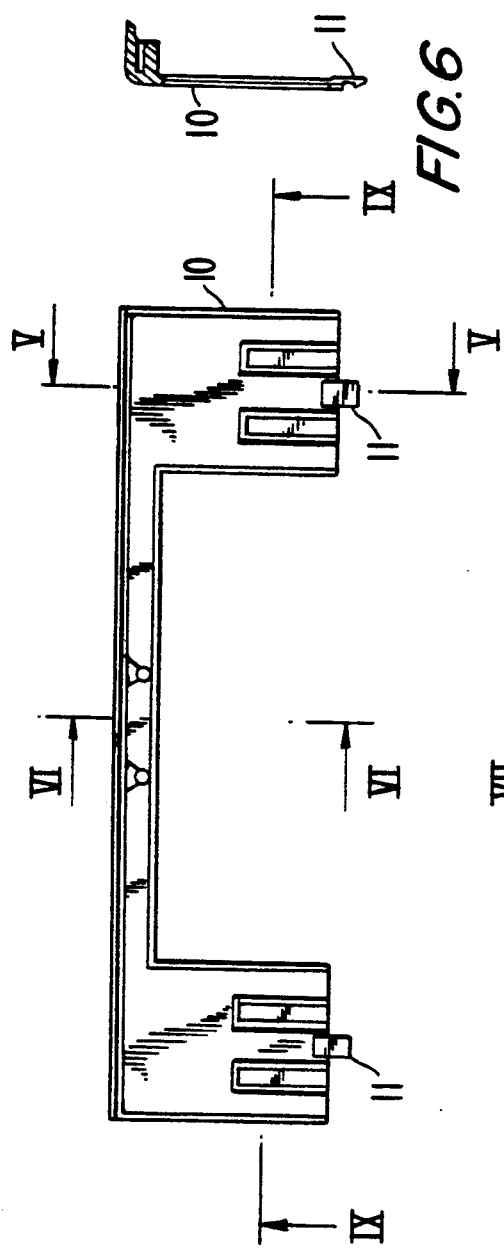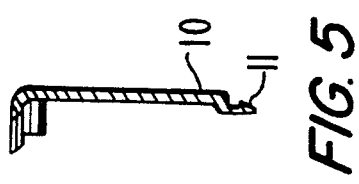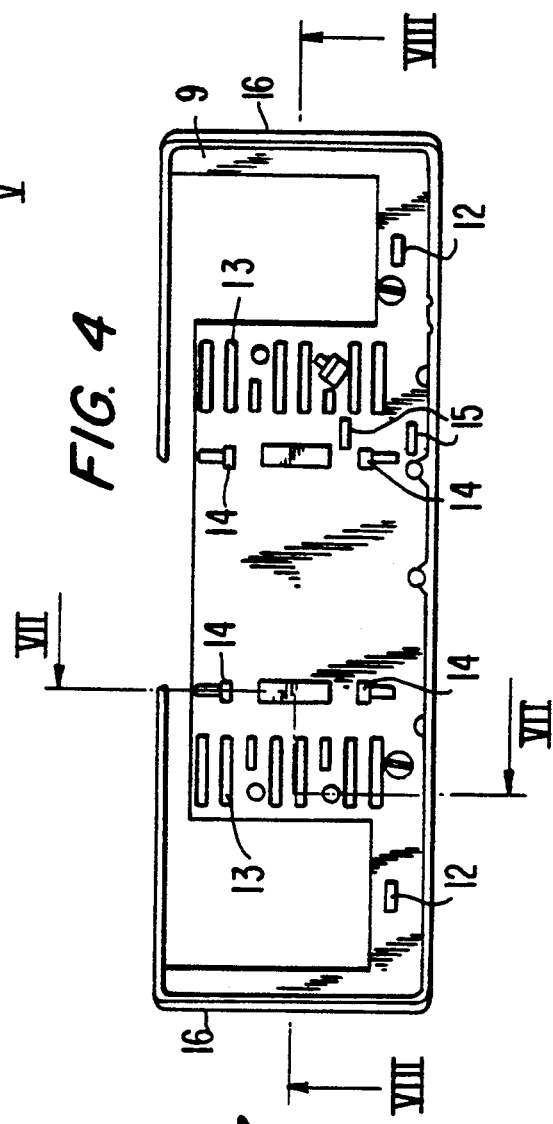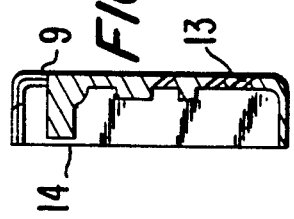

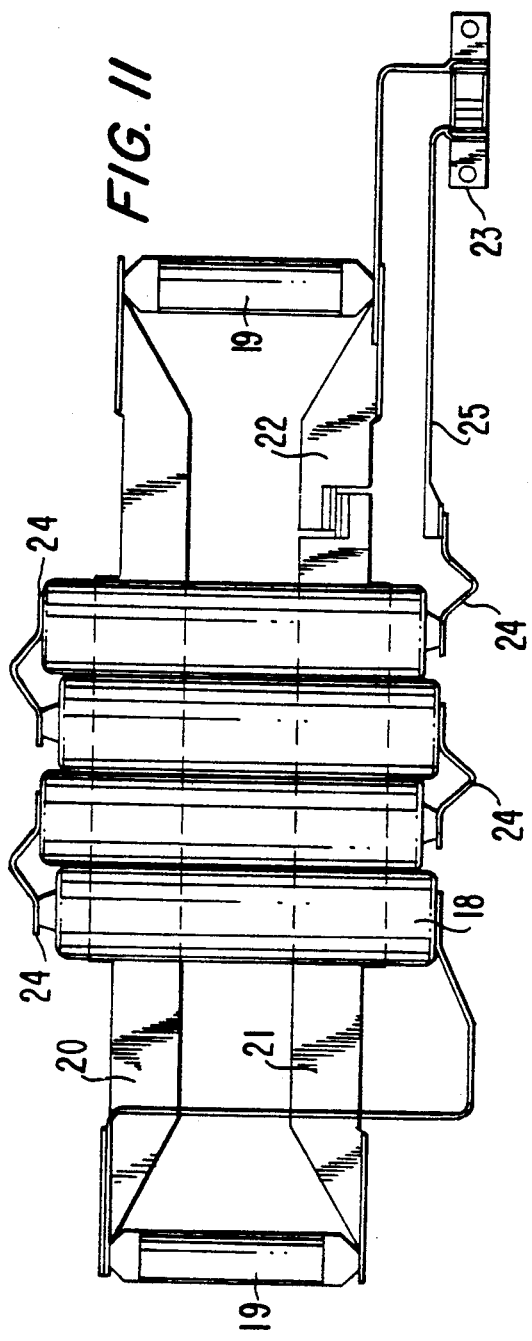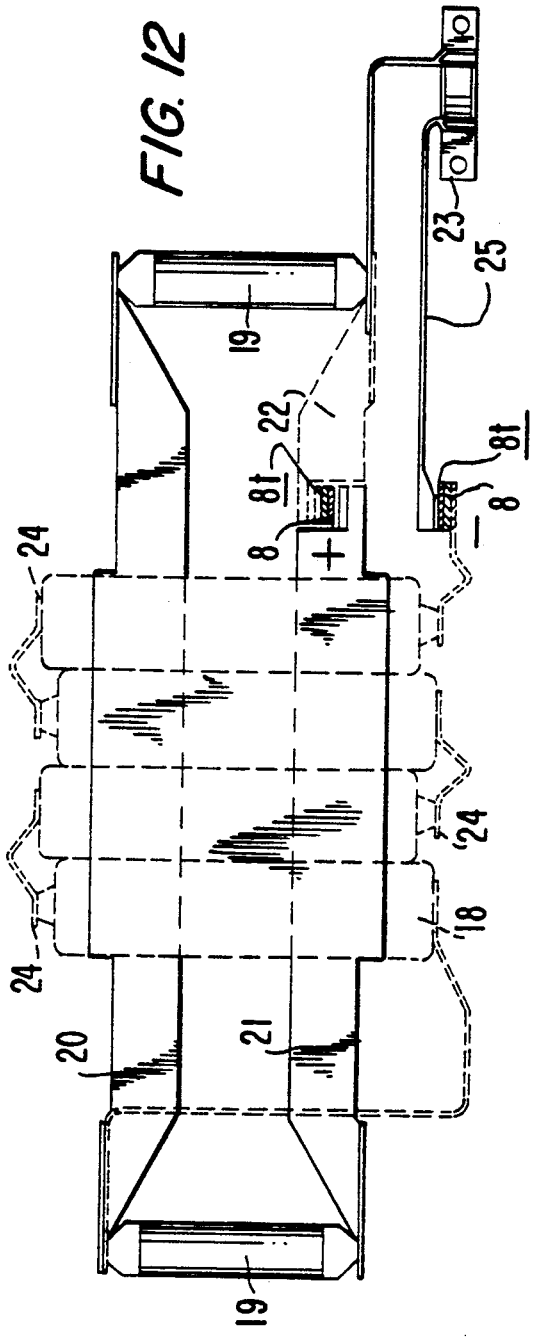

REMOVABLE MIRROR DEVICE FOR MOTOR VEHICLE INTERIORS

BACKGROUND OF THE INVENTION

The present invention relates to a removable mirror device for motor vehicle interiors and, in particular, provided with electric illumination means switchedly supplied from dry batteries lodged within the device or from the motor vehicle battery.

A so-called vanity mirror mounted in the passenger side sun visor of motor vehicles is well known. Constant technological improvements are being made to said vanity mirror, contributing to increasing both passenger safety and the comfort level offered by the vehicle passenger compartment.

Outstanding among such improvements for its importance and technological complexity is the incorporation of electric illumination means in the mirror itself, allowing its use to be extended independently of the light conditions external thereto, whether it be natural illumination or illumination from the illumination means disposed inside the vehicle which, moreover, are logically for other purposes such as, for example, among others, operations related with the driving of the vehicle or with accommodation of the passengers.

One such mirrors, including a reflective surface and complementary means of assembly and attachment to the sun visor structure, as well as incorporated elements having different functions, is disclosed in Spanish patent no 8801684, "New mirror for motor vehicle sun visor". The mirror comprises a container body provided with a rotating device allowing for discretional occultation of the reflective, and built-in electric illumination means supplied from the battery normally equipping motor vehicles.

The mirror disclosed in above mentioned Spanish patent no 8801684, like all known vanity mirrors incorporated in the passenger side sun visor, suffers from the drawback that, under normal conditions of use, it is not possible to extend the use of the mirror as such to the remaining occupants of the vehicle. This is due both to the position occupied by the mirror in the sun visor and to the fact that the mirror, or the support members therefor, is not removable from its housing.

SUMMARY OF THE INVENTION

Accordingly, it is an object of the present invention to provide a mirror device, in which a vanity mirror normally located in the passenger side sun visor can be extended to any occupant of the motor vehicle.

The removable mirror device for motor vehicle interiors of the invention is characterised in that it is formed by a fixed outer frame of sufficient size snugly to house therein a removable or removable mirror unit mirror with the corresponding retaining and/or ejection means as well as switching means for the supply of the electric illumination means of said mirror and by a removable mirror provided with discretionally usable electric illumination means which is supplied from the battery of the motor vehicle or switching, from dry cells in the mirror itself.

This feature of the device of the invention, i.e., the fact that the device is formed by two mutually independent components, allows one or several of said fixed outer frames to be disposed within the motor vehicle in places, which, either originally or at the user's discretion, are deemed to be appropriate for discretional use as a housing for the removable mirror.

The illumination means can with which the removable mirror of the device of the invention is provided may operate by alternatively using, through the corresponding switching means, the motor vehicle battery and the dry cells incorporated in said removable mirror as sources of power supply. Therefore the illumination means can be supplied from the motor vehicle battery when the removable mirror is housed in said fixed outer frame, while when the removable mirror is out of its housing in the fixed outer frame said means are supplied by the dry cells incorporated in the removable mirror itself. Any type of connection or link between the removable mirror and the housing thereof in the fixed outer frame is not necessary.

The design of the means switching the electric illumination means for the removable mirror allows the supply of the said illumination means from the motor vehicle battery to be optional. I.e., several fixed outer frames may be installed and only one or several of them or, even, all of them may be connected to the said battery, which will depend on the emplacements for the fixed outer frames and on the possibilities offered by the vehicle structure itself.

Where the fixed outer frame of the device is not connected to the motor vehicle battery, the removable mirror electric illumination means are supplied exclusively from the dry cells incorporated in the mirror itself.

The fixed outer frame is characterised in that it is one-piece, made preferably from plastics materials having mechanical properties appropriate for the contemplated purpose and is formed by an essentially parallelepipedic hollow rectangular receptacle open on one of the larger sides thereof, the front side under conditions of normal use. A flange is formed on the free edge of said side all around the perimeter and extends externally and perpendicularly to the remaining sides of the parallelepiped forming a dihedron therewith.

The retaining and/or ejection means for the removable mirror housed in the fixed outer frame are formed by an L-shaped rocking push means disposed at one end of the receptacle defined by said external frame and extending transversely to the longitudinal axis of the latter over a sufficient distance. It being attached to said fixed outer frame by at least one shaft on which it may rock in leverlike fashion and by a concave surface forming the inner surface of the opposed receptacle in the opposite end of said receptacle to said rocking push means.

One of the outer surfaces of the L-shaped rocking push means, i.e. the surface situated parallelly to the inner surface of the receptable facing the rocking push means when the removable mirror is housed in the fixed outer frame and forms a concave surface having a contour equal or similar to the one formed by the said inner surface of the receptacle. The other outer surface of the rocking push means is adapted to be urged by hand allowing removal of the removable mirror when it is housed in the fixed outer frame.

In this way, the housing of the removable mirror in the fixed outer frame is defined between the facing concave surfaces.

The switching means for supplying the electric illumination means with which the removable mirror is provided and situated in the interior of the receptacle defined by fixed outer frame. They are formed by two opposed projections of essentially right parallelepipedic shape or any other appropriate shape for the contemplated purpose, and situated a relatively short distance apart. Said projections are provided with the corresponding terminals of appropriate shape and size for electrical connection by members of known technology, to the motor vehicle battery.

The removable mirror is characterised in that it is formed by a main body of sufficient volume to contain the electric illumination means and a dry battery with sufficient capacity for supplying said means. The a mirror may be either traditional or of any other known technology, attached to a translucent material wholly or partially framing it. The electric illumination means may provide a diffuse illumination in the immediate environment of the removable mirror.

The main body of the removable mirror, which is essentially a right parallelepiped open on one of the longer sides thereof, is formed by a base body and by a rear cover. They are both produced from plastics materials of appropriate mechanical properties and may be coupled together by engaging tabs and corresponding retaining apertures in the rear cover and the base body respectively.

Said base body is also provided with ventilation apertures of sufficient number and size to maintain the temperature inside the removable mirror at an appropriate level for the correct operation of the components housed therein. There are mirror retaining supports and the corresponding apertures allowing the snug passage of the switching projections mounted in the fixed outer frame when the removable mirror is located in the housing defined by the fixed outer frame.

The shorter side surfaces perpendicular to the longitudinal axis of the main body of the removable mirror are preferably provided along the, whole length thereof with a surface of convex contour. The convex contour snugly fits with the corresponding concave contours forming one of the external surfaces of the L-shaped rocking push means, and the inner surface of the receptacle is defined by the fixed outer frame facing it.

The mirror is firmly attached to a translucent material which preferably forms a frame for said mirror although both may logically adopt other mutual configurations equally appropriate for the proposed purpose.

Both the mirror and the translucent material to which it is attached are, in turn, firmly attached, by processes and materials of known technology, to the free edge of the open side of the said main body and defined in the base body.

The electric illumination means housed in the interior of the main body of the removable mirror are formed by one or several standard incandescent lamps and by discretional switching and electrical connection members of known technology. In view of their nature and situation in the interior of said main body, said electrical connection members allow the actuation of the switching projections housed in the fixed outer frame when the removable mirror is located in the housing defined in the fixed outer frame. The lamps are located relative to the translucent material so as to optimise the external illumination of the immediate environment of the mirror. An operating member directly associated with the discretional switching member which projects to the exterior and is operatable at will.

BRIEF DESCRIPTION OF THE DRAWINGS

The removable mirror device for motor vehicle interiors of the invention is represented in the sheets of drawings attached hereto. In the drawings:

FIG. 1 is a front view of the object of the invention showing an internal distribution of the components thereof.

FIG. 2 is a cross section view on the line II—II of FIG. 1.

FIGS. 3 and 4 are front views of corresponding complementary members forming part of the device of the invention.

FIG. 5 is a cross section view on the line V—V of FIG. 3.

FIG. 6 is a cross section view on the line VI—VI of FIG. 3.

FIG. 7 is a cross section view on the line VII—VII of FIG. 4.

FIGS. 11 and 12 show a distribution of the components of the electrical circuit of the device housed in the removable mirror, their interconnection and their respective operating modes.

DETAILED DESCRIPTION OF THE PREFERRED EMBODIMENT

Figure 8:
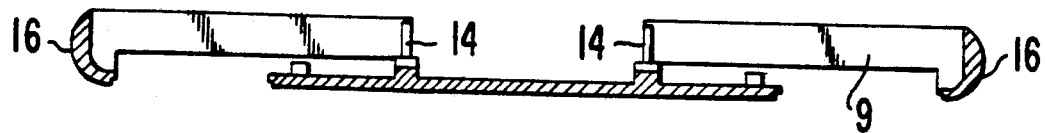
FIG. 8 is a cross section view on the line VIII—VIII of FIG. 4.
Figure 9:
FIG. 9 is a cross section view on the line IX—IX of FIG. 3.

The removable mirror device for motor vehicle interiors of the invention shown in FIGS. 1 and 2 includes a fixed outer frame ME and a removable mirror or removable mirror unit EA.

The fixed outer frame ME is one-piece and preferably made from plastics materials having mechanical properties adequate for the contemplated purpose. It is formed by an essentially right parallelepipedical receptacle R which is open on one of the larger sides 1, corresponding to the front side in this embodiment, as shown in FIG. 2.

An outer flange 2 is provided in said receptacle R on the free edge of the sides of the parallelepiped forming a dihedron with the side 1. The outer flange 2 extends around the perimeter and projects over a relative small distance perpendicularly to the said sides, as shown in FIGS. 1 and 2.

The outer flange 2 is used for concealing the perimeter. It is produced by mechanical means and usually has an irregular contour of the opening. This allows assembly of the fixed outer frame ME in the sun visor structures of motor vehicles or in the structure of other parts of the vehicle passenger compartment, such as doors or seat backrests (not shown in the drawing).

The retaining and/or ejection means for the removable mirror EA are disposed in the receptacle R in this embodiment. They are formed by a rocking push means 3 attached to a transverse shaft 4 so that the rocking push means 3 may rock sufficiently in leverlike fashion. Both the rocking push means 3 and the transverse shaft 4 are situated in one end of the receptacle R. The retaining and/or ejection means also comprise a concave surface forming an inner side wall 5 of the parallelepiped forming of the receptacle R. The concave surface faces the rocking push means 3 at the opposite end.

An outer surface 6 of the L-shaped rocking push means 3 which faces the inner surface 5 of the receptacle R as shown in FIG. 2, forms a concave surface having the same profile as the inner surface 5.

In this way a housing is defined both facing concave surface in the interior of the receptacle R of the fixed outer frame ME. The removable mirror EA may be snugly fit in this housing.

An outer surface 7 of the L-shaped rocking push means 3 used for hand operation allowing removal of the removable mirror EA from the housing in the receptacle R.

FIGS. 1 and 2 show in detail how the removable mirror EA is located in the housing in the fixed outer frame ME.

Also disposed in the receptacle R of the fixed outer frame ME are two switching projections 8, shown in FIG. 12. In this embodiment they are essentially parallelepipedic in shape and are provided with corresponding terminals 8t which are optionally connected to the motor vehicle battery.

As shown in FIGS. 1 and 2, the removable mirror EA includes a body CP, a mirror E framed in its perimeter by translucent material, and an electric illumination means IE.

The main body CP is essentially parallelepipedic in shape. It is open on one of the larger sides the one containing the mirror E, and has a base body 9 and a rear cover 10, as shown in FIGS. 3 and 4. Both members forming the main body CP are made preferably from plastics materials having mechanical properties adequate for the contemplated purpose.

Both the base body 9 and the rear cover 10 may be coupled together by two engagement tabs 11 and the corresponding retaining apertures 12, disposed in the base body 9 and rear cover 10 respectively. The are suitably dimensioned to ensure both a firm coupling together of both said members and, once coupled together, their discretional separation.

The design of the base body 9 and the rear cover 10 is as shown in detail in FIGS. 3, 4, 5, 6, 7, 8 and 9. It allows access to the interior of the removable mirror EA through the back thereof when both said members are separated, to perform the operations of maintenance and replacement of the unit formed by the components housed therein.

The base body 9 is also provided with ventilation apertures 13. Their number and arrangement shown in FIGS. 4 and 7 of this embodiment, ensure that, under normal conditions of use of the device of the invention, the temperature within the removable mirror EA will be maintained at appropriate levels for the correct operation of the components housed in the interior thereof.

The base body 9 is also provided with the four supports 14. The supports are suitably dimensioned and distributed as shown in FIGS. 2, 4 and 7 for preventing possible vibration of the mirror caused by the motor vehicle when running.

FIG. 4 of this embodiment also shows two passages 15 in the base body 9. They allow snug passage of the corresponding switching projections 8 attached to the respective connection terminals 8t thereof during the insertion and/or removal of the removable mirror EA in or from its housing in the fixed outer frame ME.

Two outer surfaces 16 of the base body 9 of the main body CP of the removable mirror EA are perpendicular to the longitudinal axis of removable mirror EA. They are provided along the whole length thereof, as shown in FIGS. 2 and 8, with convex surfaces These convex surfaces are snugly adapted to the concave surfaces forming the inner surface 5 of the receptacle R and the outer surface 6 of the L-shaped rocking push means 3 situated at one longitudinal end of the fixed outer frame ME.

Such snug fitting of the above described concave and convex surfaces is clearly shown in FIG. 2. When the removable mirror EA is located in the housing in the receptacle R of the fixed outer frame ME, as shown in FIGS. 1 and 2, manual operation of the surface 7 of the L-shaped rocking push means 3, which acts as a power arm of a first order lever, causes the concave and convex surfaces to slide over each other. Thereby the removable mirror EA is removed from the housing thereof.

Figure 10:
FIG. 10 is a cross section view of a member forming the device of the invention.

The mirror E of known technology as shown in FIGS. 2 and 10 is framed by a continuous strip of translucent material 17. The mirror E is firmly attached to the translucent material 17.

The mirror E and the translucent strip 17 are in turn firmly attached to the main body CP. Both members form the front surface of the removable mirror EA as shown in detail in FIG. 2.

In this way, the inner space of the removable mirror EA, which is defined by the main body CP and mirror E attached to the translucent frame 17, may house the dry cells 18. The cells are used as a power source for supplying the electric illumination means IE, which are also housed in the inner space.

FIGS. 11 and 12 show in detail the components of the electric illumination means IE of the device, as well as the interconnection and operation thereof.

Two incandescent lamps 19 of the illumination means are connected together and with a supply circuit by metal strips 20, 21 and 22 which simultaneously serve as lampholders.

As shown in FIG. 12, with the removable mirror EA in the housing in the receptacle R of the fixed outer frame ME, the two switching projections 8 and the corresponding terminals 8t are connected to the motor vehicle battery and supply the incandescent bulbs 19 through a switch 23.

The two switching projections 8 and corresponding terminals 8t, apart from supplying the incandescent lamps 19, perform the following functions: disconnection of the dry cells 18 from the supply circuit to the lamps and connection of the latter n series to adapt their operating voltage to the voltage supplied by the motor vehicle battery.

FIG. 11 shows in detail how, when the removable mirror EA is not in the housing therefor in the fixed outer frame ME, the two incandescent lamps 19 are supplied through the switch 23 from the dry cells 18. The cells as shown in FIGS. 11 and 12, are connected together in series by the conductors 24.

When the switching projections 8 and the corresponding terminals 8t cease to function as described above, the conductor strips 21-22 and 24-25 provide the following functions in view of their resilience: they connect the dry cells 18 to the supply circuit of the two incandescent lamps 19 and connect the lamps in parallel to adapt their operating voltage to the voltage supplied by the dry cells 18 incorporated in the removable mirror EA.

In this way, the operation of the switching projections 8 and the corresponding terminals 8t allows the electric illumination means IE to be supplied with 12

VDC, which is the voltage usually supplied by the battery equipping motor vehicles, when the removable mirror EA is in the housing therefor in the fixed outer frame ME. Otherwise i.e. when the removable mirror EA is removed from the housing therefor in the fixed outer frame ME, the illumination means IE are supplied with 6 VDC from the dry cells 18 situated in the removable mirror EA.

The operation of the switch 23 is illustrated in FIG. 1 on a larger scale. An operating member 23' is coupled mechanically to the switch 23 by way of the forked pins 23" and extends to the exterior. Therefore it may be comfortably operated by the user irrespective of whether the removable mirror EA is located in the fixed outer frame ME or not.

The changes in the voltage supplied to the electric illumination means IE do not imply, a change in the degree of illumination created by the removable mirror EA in the surrounding thereof. The reason is that said voltage changes are simultaneously accompanied with the corresponding changes in the interconnection, in series or in parallel, of the two incandescent lamps 19. Thereby the operation voltage of said lamps, which is 6 VDC, remains constant, with the light flux provided by the lamps 19 also remaining constant in this way.

It will be understood that each of the elements described above, or two or more together, may also find a useful application in other types of constructions differing from the types described above.

While the invention has been illustrated and described as embodied in a removable mirror device for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A removable mirror device for motor vehicle interior, comprising a fixed outer frame; a mirror unit which is removably and snugly housed in said fixed outer frame; electric illumination means provided in said mirror unit; dry cells located in said mirror unit; switching means operative for supplying said electric illuminating means of said mirror unit alternatingly from said drive cells located in said mirror unit and from a battery of a motor vehicle; and retaining and ejecting means for said mirror unit, said retaining and ejecting means including a shaft and an L-shaped rocking push means extending transversely to a longitudinal axis of said fixed outer frame and rocking on said shaft so as to act on said mirror unit.

2. A removable mirror device as defined in claim 1, wherein fixed outer frame is one-piece and formed by essentially parallelepipedic hollow receptacle which is open at one of its larger sides, said one larger side having a free edge provided with a flange which extends externally and perpendicularly to the remaining sides of said outer frame.

3. A removable mirror device as defined in claim 1, wherein said fixed outer frame has an inner concave surface, said L-shaped rocking push means having a concave surface with a contour corresponding to said inner concave surface of said fixed outer frame.

4. A removable mirror device as defined in claim 3, wherein said L-shaped rocking push means has another outer surface adapted to be urged by hand so as to remove said removable mirror unit from said fixed outer frame.

5. A removable mirror device as defined in claim 1, wherein said mirror unit includes a main body accommodating said electric illumination means and said dry cells, and a mirror unit element connected with said main body.

6. A removable mirror device as defined in claim 5, wherein said mirror unit further includes a translucent material attached to said mirror element.

7. A removable mirror device as defined in claim 6, wherein said main body has an open side with a free edge, said mirror element and said translucent material being firmly attached to said free edge of said open side of said main body.

8. A removable mirror device as defined in claim 5, wherein said electric illuminating means is arranged so that it provides a diffuse illumination in immediate vicinity to said mirror unit.

9. A removable mirror device as defined in claim 1, wherein said mirror unit has a main body including a base body and a rear cover coupled with one another; and further comprising means for coupling said base body with said rear cover.

10. A removable mirror device as defined in claim 9, wherein said base body and said rear cover form two elements, said means for coupling said base body with said rear cover including retaining apertures provided in one of said elements and engaging tabs which engage in said retaining apertures and provided in another of said elements.

11. A removable mirror device as defined in claim 1, wherein said mirror unit has a base body provided with ventilation apertures for maintaining temperature inside said mirror unit at required level for proper operational components accommodated in said base body.

12. A removable mirror device as defined in claim 1, wherein said mirror unit has a base body and a mirror element connected with said base body, said mirror unit also having supports for retaining said mirror element.

13. A removable mirror device as defined in claim 1, wherein said L-shaped rocking push means has an inner concave surface, said fixed outer frame having an inner concave surface, said mirror unit having a main body with two convex surfaces which are perpendicular to a longitudinal axis of said main body and snugly fit with said concave surfaces of said L-shaped rocking push means and said fixed outer frame.

14. A removable mirror device for motor vehicle interior, comprising a fixed outer frame; a mirror unit which is removably and snugly housed in said fixed outer frame; electric illumination means provided in said mirror unit; dry cells located in said mirror unit; and switching means operative for supplying said electric illuminating means of said mirror unit alternatingly from said drive cells located in said mirror unit and from a battery of a motor vehicle, said switching means including two switching opposite projections located in said fixed outer frame at a distance from one another and provided with terminals for electrical connection to the battery of the motor vehicle, said electric illumination means including at least one incandescent lamp and a switching member and an electrical connection member arranged so that said switching projections are actuated when said mirror unit is located in said frame.

15. A removable mirror device as defined in claim 14, wherein said mirror unit has a base body provided with apertures allowing snug passage of said switching projections and said terminals when said mirror unit is located in said fixed outer frame.

16. A removable mirror device as defined in claim 14, and further comprising an operating member associated with said switching member and projecting outwardly so as to be operable by a user at will.

17. A removable mirror device as defined in claim 14, wherein said fixed outer frame is one-piece and formed by essentially parallelpipedic hollow receptacle which is open at one of its larger sides, said one larger side having a free edge provided with a flange which extends externally and perpendicularly to the remaining sides of said outer frame.

18. A removable mirror device as defined in claim 14, wherein said mirror unit includes a main body accommodating said electric illumination means and said dry cells, and a mirror element connected with said main body.

19. A removable mirror device as defined in claim 18, wherein said mirror unit further includes a translucent material attached to said mirror element.

20. A removable mirror device as defined in claim 19, wherein said main body has an open side with a free edge, said mirror element and said translucent material being firmly attached to said free edge of said open side of said main body.

21. A removable mirror device as defined in claim 18, wherein said electric illuminating means is arranged so that it provides a diffuse illumination in immediate vicinity to said mirror element.

22. A removable mirror device as defined in claim 14, wherein said mirror unit has a main body including a base body and a rear cover coupled with one another; and further comprising means for coupling said base body with said rear cover.

23. A removable mirror device as defined in claim 22, wherein said base body and said rear cover form two elements, said means for coupling said base body with said rear cover including retaining apertures provided in one of said elements and engaging tabs which engage in said retaining apertures and provided in another of said elements.

24. A removable mirror device as defined in claim 14, wherein said mirror unit has a base body provided with ventilation apertures for maintaining temperature inside said mirror unit at required level for proper operational components accommodated in said base body.

25. A removable mirror device as defined in claim 14, wherein said mirror unit has a main body and a mirror element connected with said main body, said mirror unit also having supports for retaining said mirror element.

26. A removable mirror device as defined in claim 14, wherein said mirror unit has a base body provided with apertures allowing snug passage of said switching projections and said terminals when said mirror unit is located in said fixed outer frame.

* * * * *